United States Patent [19]

Bercher

[11] 4,021,831

[45] May 3, 1977

[54] PROCESS AND DEVICE FOR THE PHOTOGRAPHIC REPRODUCTION OF DIAPOSITIVES

[75] Inventor: Francois L. Bercher, Tour-de-Peilz, Switzerland

[73] Assignee: Elinca S.A., Renens, Switzerland

[22] Filed: Dec. 13, 1974

[21] Appl. No.: 532,498

[30] Foreign Application Priority Data

Feb. 5, 1974  Switzerland .................. 1547/74

[52] U.S. Cl. .................. 354/295; 354/126; 355/71

[51] Int. Cl.[2] .................. G03B 17/56; G03B 15/03

[58] Field of Search .................. 355/67, 70, 71, 80, 355/39, 18; 354/75, 76, 77, 78, 126, 295; 350/314, 318; 240/1.3, 3.1

[56] References Cited

UNITED STATES PATENTS

| 400,140 | 3/1889 | Stockly | 350/314 |
|---|---|---|---|
| 2,301,419 | 11/1942 | Lew | 240/3.1 X |
| 2,621,569 | 12/1952 | Glassey | 354/126 |
| 3,577,898 | 5/1971 | Bragg | 355/71 X |
| 3,619,055 | 11/1971 | Archer et al. | 355/70 X |
| 3,653,760 | 4/1972 | Johnson | 355/67 X |
| 3,689,148 | 9/1972 | Black | 355/39 X |
| 3,722,998 | 3/1973 | Morse | 355/71 |
| 3,836,923 | 9/1974 | Malick | 355/67 X |
| 3,854,815 | 12/1974 | McIntosh | 355/67 |
| 3,905,701 | 9/1975 | David | 355/71 |

FOREIGN PATENTS OR APPLICATIONS

| 1,058,367 | 5/1959 | Germany | 355/80 |
|---|---|---|---|
| 873,826 | 7/1961 | United Kingdom | 355/70 |

Primary Examiner—Edna M. O'Connor
Attorney, Agent, or Firm—Anthony J. Casella

[57] ABSTRACT

A process and device for the photographic reproduction of diapositives whereby during exposure of a film to light from an illuminated diapositive, the film is simultaneously partially fogged by diffuse light reaching the said film directly and without passing through the diapositive.

3 Claims, 4 Drawing Figures

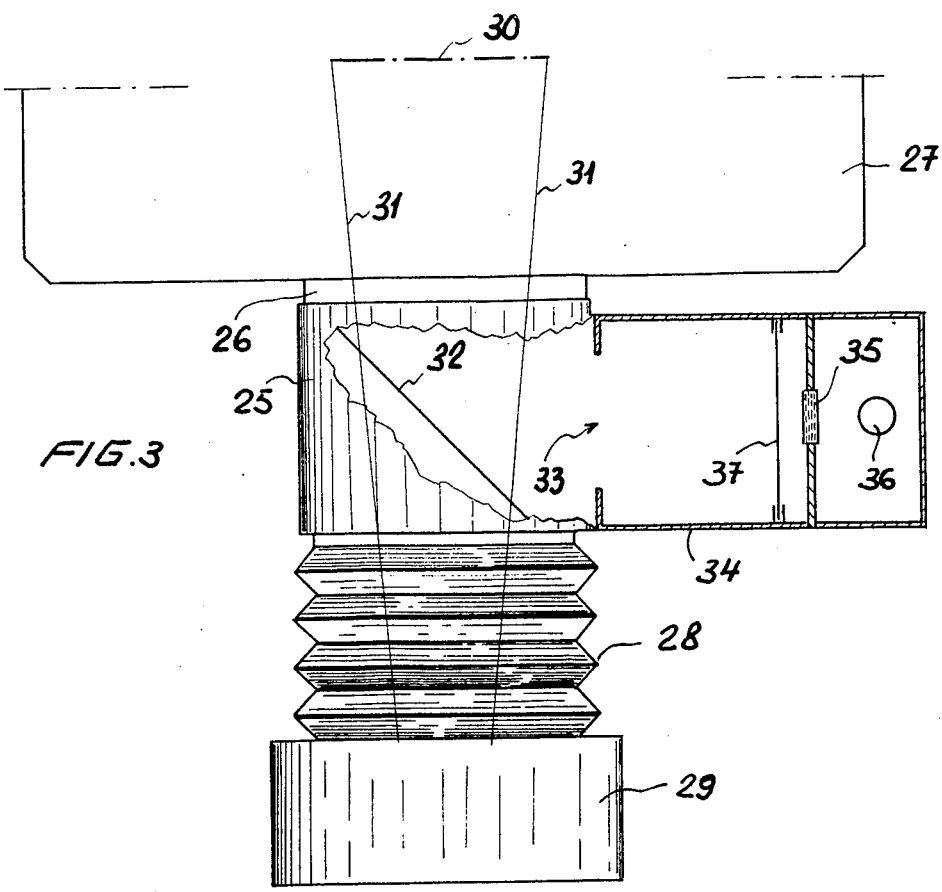
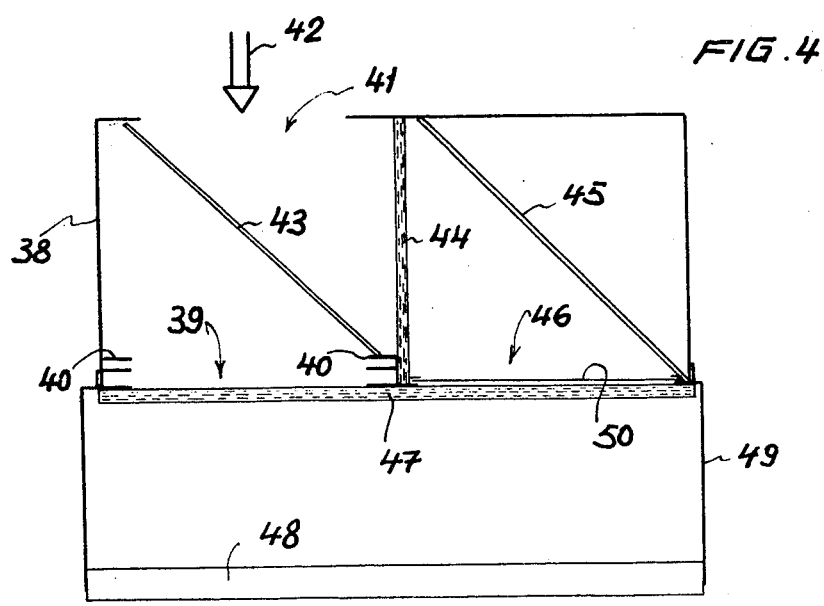

PROCESS AND DEVICE FOR THE PHOTOGRAPHIC REPRODUCTION OF DIAPOSITIVES

The photographic reproduction of diapositives (transparent positives) usually involves problems in connection with so-called "normal" films, for the diapositives obtained therefrom are generally too contrasty.

A first solution of this problem is obtained by a pre-exposure or partial fogging of the film used for reproduction, and there is at present on the market a special pre-exposed film intended specifically for the reproduction of diapositives. The results obtained by means of this special film are excellent, but in practice, this solution is not ideal, for this special film is supplied in great lengths, thus involving a certain amount of waste or tedious manipulation (cutting and loading) if it is not necessary to use all the film during one reproduction session.

Another solution has been proposed which consists in effecting an initial exposure of the film in the camera before making the final or true exposure. In other words, an initial exposure or partial fogging of the film is made using a suitably selected light course, then the final exposure is made on the portion of film fogged by the first exposure, i.e. two successive exposures are made. The result obtained is good, but it requires two exposures and two manipulations between these two exposures to ensure that the second exposure is made on the portion of initially exposed film, thus involving a loss of time.

According to the present invention there is provided a process for the photographic reproduction of diapostives, wherein during exposure of a film to light from a illuminated diapositive, the film is smultaneously partially fogged by diffuse light reaching the said film directly and without passing through the diapositive.

This supply of light may be taken from the light source illuminating the diapositive. It may also come from an additional light source. The light source may be a lamp or a flash.

In this manner, with a single exposure and without manipulations or wasting of the film, the necessary reduction of contrast is obtained on the reproductions of diapositives, without the necessity of using a special pre-exposed film.

The present invention also concerns a device for carrying out the above-mentioned process.

A device for carrying out the process claimed in claim 1, comprises a chamber adapted to be placed in the path of the light rays forming an image of the diapositive on the film, this chamber having an opening for the admission of the said rays and an opening for the outlet of the rays in the direction of the film, and including means allowing light to pass between the said openings and for adding a fogging light to the image rays.

The accompanying drawings show three embodiments of a device according to the present invention.

FIG. 3 is a plan view, in part section, of a second embodiment;

FIG. 4 is a section through a third embodiment;

Figure 1:
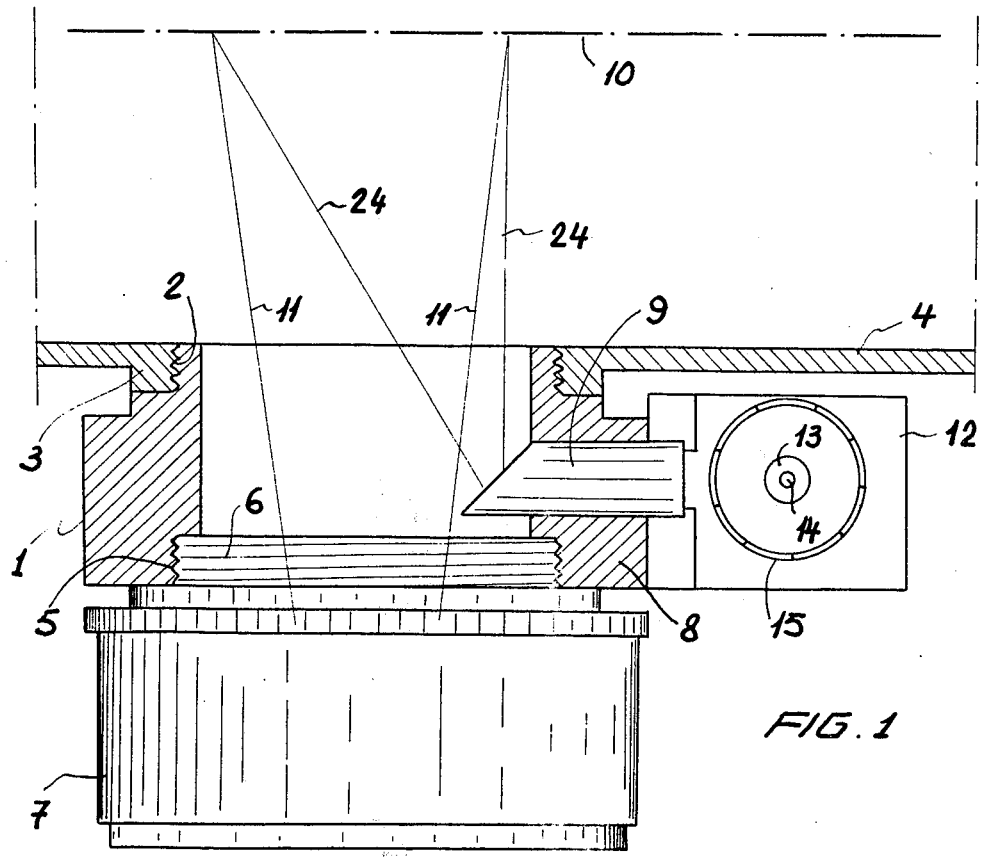
FIG. 1 is a view in plan and part cross-section, of a first embodiment.
Figure 2:
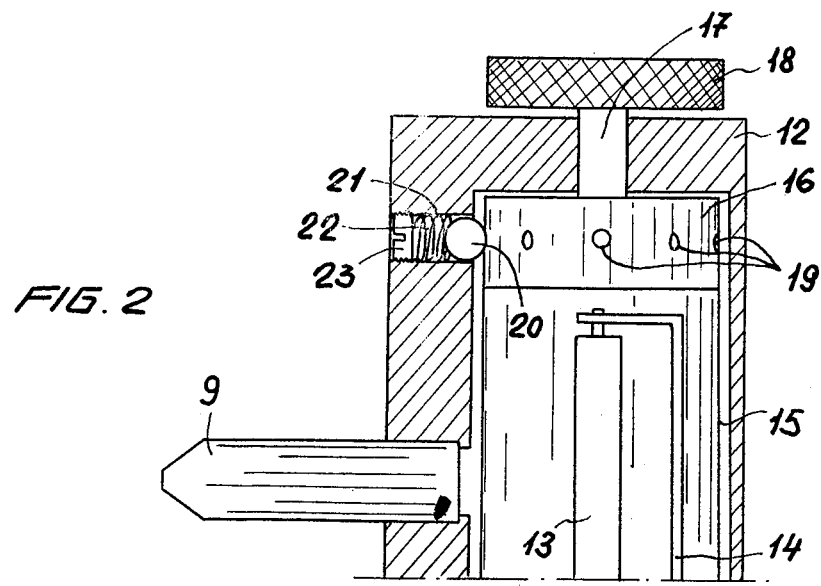
FIG. 2 is a section through an enlarged detail of FIG. 1.

The device shown in FIGS. 1 and 2 is adapted to be secured to a camera and comprises a ring 1 having a threaded shoulder 2 intended to engage in the thread of the lens mount 3 of a camera shown schematically at 4.

Opposite the threaded shoulder 3, the ring 1 is provided with a thread 5 in which the thread 6 of a lens 7 engages. Hence the ring 1 is axially aligned between the camera and its lens and forms with them a unit providing transmission of images from the lens to the camera.

In FIG. 1, the chain-dotted line 10 represents the film in the camera 4, and the lines 11 show the extreme positions of the light rays coming through the lens and reaching the film 10.

Inserted in the side wall 8 of the ring is a light transmitter 9 formed by a bunch of light conducting fibres, one end of which communicates with the interior of the ring, whilst its other end communicates with a housing 12 coupled to the ring 1. A flash tube 13, mounted on a bar 14, is placed in the housing 12, opposite the respective end of the light conductor 9. The flash tube 13 is fed from a suitable current source and its flashing may be controlled in known manner by the camera 4. Around the flash tube is a cylinder 15 carrying a series of neutral filters of different gradations, this cylinder of filters being mounted on a drum 16 connected to a shaft 17 pivoted in the wall of the container 12 through which it passes and carrying, on the outside thereof, an operating knob 18. The periphery of the drum 16 has a series of perforations 19, each corresponding to one of the filters of the cylinder and registering with a stop ball 20 sliding in a recess 21 formed in the wall of the container 12, this stop ball 20 being continually urged towards the drum 16 by a spring 22 retained by a screw 23 engaging in a hole 21.

The end of the light conductor 9 which is within the ring 1 is located so that it does not enter the beam of light rays forming the image and passing through the lens 7 to impinge on the film 10. This end of the light conductor is however designed so that some light emitted by the flash tube 13 is directed on to the film 10, at the point where said film is to be exposed to the light rays forming the image and passing through the lens 7. The lines 24 show the limits o the light rays originating from the concuctor 9. When a diapositive is to be reproduced, the flash tube 13 lights up during the exposure and some light emitted therefrom is directed onto the film 10 by the light conductor 9. The camera shutter is momentarily opened and light from the diapositive which is separately illuminated also reaches the film 10 through the lens 7. The film is therefore partially fogged during exposure by an additional supply of light which does not pass through the diapositive and which makes it possible to weaken the contrast on the film 10.

By rotating the knob 18, the screen of filters 15 is turned and it is therefore possible to select the filter which it is desired to interpose between the flash 13 and the light conductor 9. When each of the filters is correctly located, the drum 16 is arrested as the result of the introduction of the ball 20 into the corresponding aperture 19.

The described device may be used without the filter cylinder 15, but its use is preferable, for it makes it possible to regulate the supply of fogging light. The flash tube 13 may be replaced by any other light source, such as a lamp providing normal light and, in this case instead of the described filters, it would be possible to vary supply of fogging light by varying the intensity of the lamp output. Again, the flash tube 13 is eliminated and the light conductor 9 is connected to the light source illuminating the diapositive which has to be reproduced, the fogging light which does not pass through the diapositive being taken from the light source for the diapositive, by means of a light conductor. Similarly, the filter cylinder may be replaced by any other device capable of varying the level of illumination of the light source, for example, a diaphragm or any arrangement of filters placed between the light source and the light transmitter.

Finally, the ring 1 may be connected to the lens 7 by means of a bellows in which the light conductor 9 would play the same part as in the case of the ring 1. The attachment of the ring 1 to the camera and the lens may also be achieved by means of a bayonet joint if the camera and its lens are provided with such a connection.

It should be pointed out that, since the ring 1 is attached to the camera between the latter and the lens, the supply of fogging light not passing through the diapositive is always effected at a constant distance from the film, and the effect of this light on the film does not depend on the lens diaphragm setting.

The device shown in FIG. 3 is adapted, as before, to be secured to a camera, beetween the latter and its lens. This device also comprises a ring 25 capable of being secured for example by screwing in a lens mount 26 of a camera shown schematically at 27. The ring 25 carries a bellows 28 to which a lens 29 is secured. The ring 25 is axially aligned between the camera and its lens and forms a unit therewith, permitting the transmission of images through the lens to the camera film. The chain-dotted line 30 represents the film in the camera and the lines 31 show the limits of the light rays coming from the lens and impinging on the film 30.

A semi-transparent mirror 32, disposed at 45° to the axis of the lens 29, is secured in the ring 25, the mirror being also inclined relatively to an opening 33 formed in the wall of the ring 25 and communicating with a housing 34 attached to the ring 25. Located in the housing 34, opposite the opening 33, is a diffusing screen 35 behind which a lamp 36 is provided, fed from a suitable current source (not shown); the degree of illumination of the lamp may be controlled by conventional means. A removable and interchangeable neutral filter 37 is disposed between the screen 35 and the opening 33.

When a diapositive is photographed the diapositive is illuminated from its own source and the camera shutter is opened. The semi-transparent mirror 32 lets the image coming from the lens through to the film 30 and also reflects some of the light which it receives from the lamp 36 by way of the focussing screen 35 and the filter 37 to the film. As in the preceding embodiment, the film is partially fogged during exposure by the additional supply of light which does not pass through the diapositive, and consequently the contrast on the reproduction of the diapositive is weakened.

By changing or eliminating the removable filter 37, it is possible to modify the intensity of the supply of fogging light, and this may also be obtained by varying the light output of the lamp 36. The lamp 36 may be replaced by any other light source, such as a flash tube.

As in the preceding case, the ring 25 may be used without the bellows 28, or may be replaced by a bellows incorporating the semi-transparent mirror 32. Here also, the supply of fogging light is effected at a constant distance from the film, and the additional lighting produced on the film does not depend on the lens diaphragm.

The device shown in FIG. 4 is not intended to be interposed between the camera and its lens, and is an independent unit against which the camera is located.

This device comprises a casing 38 having an opening 39 opposite which the diapositive is located. This diapositive is not shown in the drawing and its position opposite the opening 38 may be ensured by any suitable locating frame. In the drawing, retaining members for the diapositive are represented by two slides 40. Opposite the opening 39, there is a second opening axially aligned therewith in which the lens of the camera used for filming the diapositive is located. This camera is indicated in the drawing by the arrow 42. Between the openings 39 and 41 a semi-transparent mirror 43 is located at 45° to the axis of the said openings, the mirror being also inclined relatively to a diffusing screen 44 located in the casing 38, substantially perpendicular to a plane parallel to the openings 39 and 41.

On the side of the screen 44 which is remote from the semi-transparent mirror 43, the casing 38 contains a mirror 45, also inclined at 45° and parallel to the semi-transparent mirror 43. This mirror 45 is inclined relatively to an opening 46 provided in the casing 38, substantially on the same plane as the opening 39.

In front of the openings 39 ad 46 the casing 38 carries a diffusing screen 47 in front of which there is a flash tube 48, mounted on a fitting 49 fixed to the casing 38, this flash tube being supplied and controlled by conventional means (not shown). Between the screen 47 and the mirror 45 there is a removable and interchangeable neutral filter 50 opposite the opening 46.

When the flash tube 48 is fired to light up the diapositive in the slides 40 which has to be photographed by the camera 42, the semi-transparent mirror 43 lets through the image of the diapositive and, simultaneously reflects part of the light emitted by the flash tube 48 which passes through the screen 47 ad the opening 46. This light impinges on the mirror 45 which reflects it to the mirror 43 whence it is directed towards the opening 41. The film then receives, during the expposure, supply of fogging light which does not pass through the diapositive and makes it possible to weaken the contrast of the dispositive on the reproduction.

In this way the same result is obtained as with the diapositives produced according to FIGS. 1 to 3, the only difference residing in the location of the diapositive. By changing or omitting the removable filter 50 it is possible to modify the intensity of the fogging supply of light.

According to a modification, the flash tube 48 may be replaced by any other light source, such as a filament lamp. Similarly, instead of taking from the flash tube 48 the fogging supply of light which does not pass through the diapositive, it is possible to use an independent supply of light, such as another flash tube or a lamp.

According to another modification, the mirrors 43 and 45, the diffusing screen 44 and the part of the screen 47 which is located opposite the opening 46, are omitted and the additional supply of light is provided by a glass fibre light conductor fed with light from the lighting source of the diapositive, and sending the resultant light in the direction of the opening 41.

What we claim is:

1. A device for the photographic reproduction of diapositives wherein during exposure of a film to light from an illuminated diapositive, the film is simultaneously partially fogged by diffused light reaching the said film directly and without passing through the diapositive, said device comprising:
- a chamber having a central opening adapted to be aligned with the path of the light rays forming an image of the diapositive on the film, one end of which central opening is secured to a camera and the opposite end of which is secured to the camera lens, said chamber having a transverse opening;
- a light source;
- a light conductor formed by a bunch of fibers and disposed in said transverse opening such that one end of said light conductor communicates with the interior of said chamber and the other end of said light conductor is outside the chamber opposite said light source; and
- a rotatable cylinder carrying a series of neutral filters of different gradiations disposed about said light source whereby upon actuation of said light source, light from said light source passes through one of the series of neutral filters of the rotatable cylinder and then is conducted via said light conductor to said chamber, and then the diffused light illuminates the film to provide partial fogging thereof.

2. A device as in claim 1 wherein said light source is additional to that used to illuminate the diapositive.

3. A device as in claim 1 wherein said rotatable cylinder includes manually operable means for selecting the desired neutral filter to be interposed between said light source and the light conductor.

* * * * *